UNITED STATES PATENT OFFICE.

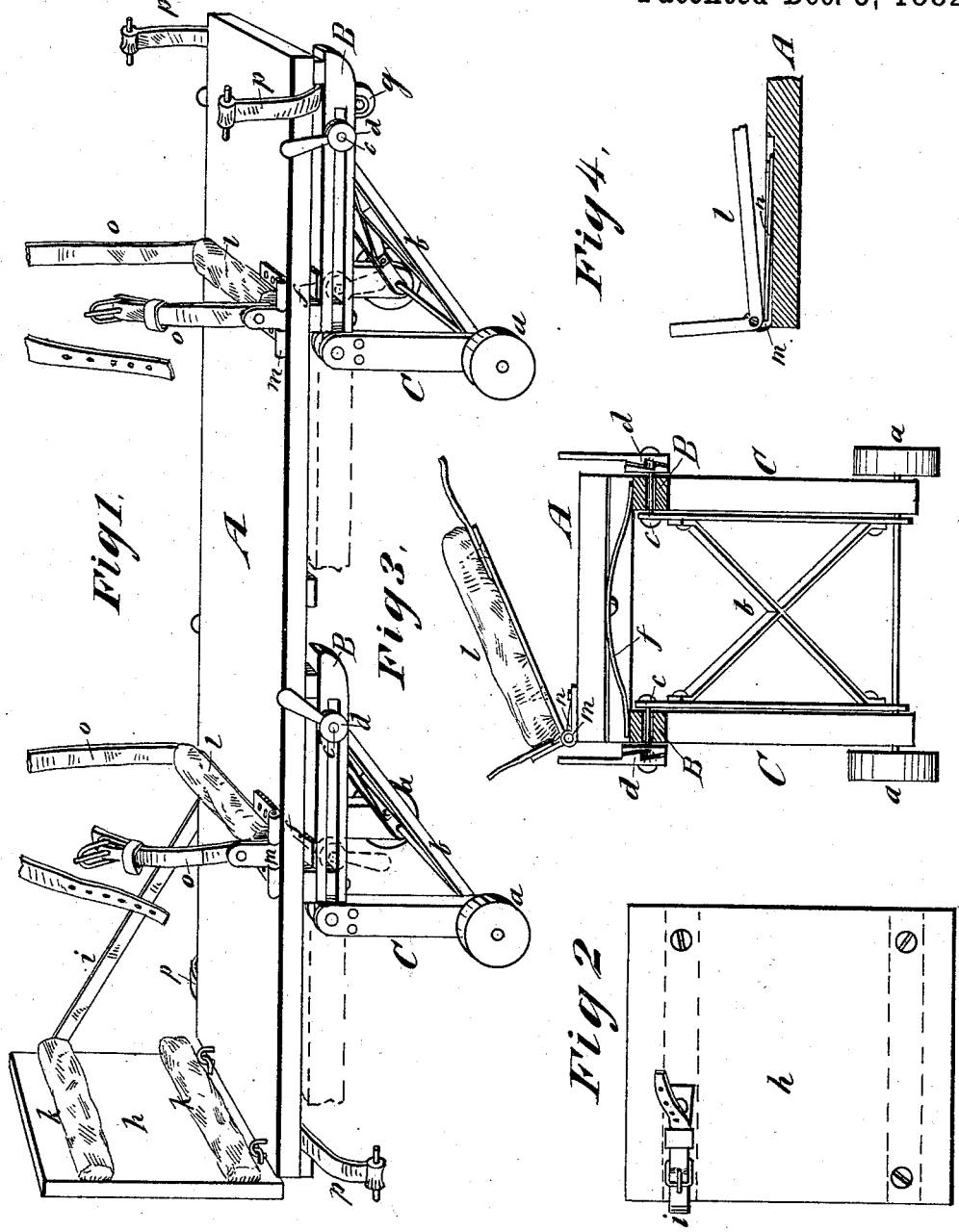

LEWIS E. HURLBUT, OF FORT DODGE, IOWA.

PIANO-TRUCK.

SPECIFICATION forming part of Letters Patent No. 268,679, dated December 5, 1882.

Application filed September 4, 1882. (Model.)

*To all whom it may concern:*

Be it known that I, LEWIS E. HURLBUT, of Fort Dodge, in the county of Webster and State of Iowa, have invented a new and Improved Piano-Truck, of which the following is a full, clear, and exact description.

My invention consists in a truck for use in loading, unloading, and transporting pianos other heavy articles, as hereinafter described and claimed.

Reference is to be had to the accompanying drawings, forming a part of this specification, in which similar letters of reference indicate corresponding parts in all the figures.

Figure 1 is a perspective side view of my improved truck. Fig. 2 is a rear elevation of the foot-board. Fig. 3 is a transverse section of the truck. Fig. 4 is a detail section.

A is the truck-bottom, of suitable length and width. To this bottom and near each end side pieces, B B, are attached at the under side, and to these pieces legs C C are hinged, so that they may be turned down to the position of use, as shown in Fig. 1, or turned up beneath the bottom A, as illustrated in dotted lines. The legs are fitted at their lower ends with wheels or rollers $a$ $a$, and from the lower ends of the legs braces $b$ extend to and are connected with pins $c$ in slots formed in the side pieces, B. To the ends of the pins $c$ cam-levers $d$ are connected, and these are used for clamping the pins $c$, and thereby holding the legs C in position. The ends of the side pieces, B, to which the legs are hinged, take upon the ends of springs $f$, that are attached to the under side of the truck, and these springs serve to relieve the jar when traveling over rough roads. At the forward end of the truck, rollers $g$ $g$ are fitted to facilitate loading the truck upon a dray. At the rear end of the truck a hinged foot-board, $h$, is attached, which is to be turned upward in the position shown in Fig. 1, for use to prevent the piano from sliding off the truck. This foot-board is provided with a flexible brace, $i$, and with pads $k$ $k$, and when not required for use can be turned down flat upon the bottom A. Upon the bottom A are padded skids $l$ $l$, which are attached at one end by hinges $m$, so that they may be turned down flat upon the bottom A, as shown in Fig. 1, for the piano to rest upon; or they may be turned upward to tip the piano in removing it from the truck. Springs $n$ are applied beneath the hinges $m$ for retaining the skids in place while the piano is being loaded upon the truck. The skids are provided with straps $o$ $o$, which straps have buckles, so that they may be secured around the piano; and at the ends of the truck are straps $p$ $p$, that are provided with suitable handles for use in lifting and carrying the truck.

The legs of the truck being adjustable, it can be readily used in carrying a piano up and down stairs, the legs being in that case turned down to rest on the stands or else up beneath the bottom. Upon a level surface the legs are to be turned down and the truck moved upon the rollers $a$. In loading upon a dray the legs are to be turned up so that the truck with the piano upon it can be readily placed upon the dray, and when unloading the legs drop automatically to place, so that they can be fastened by the cams $d$.

With this truck pianos can be readily handled and transported with a great saving of labor and without danger of marring the piano.

Having thus fully described my invention, I claim as new and desire to secure by Letters Patent—

1. The combination, with the slotted side pieces, B, and the hinged legs C, of the braces $b$, the pins $c$, and the clamps $d$, whereby the legs may be adjusted or folded, as described.

2. The foot-board of truck A, hinged at the lower end to truck and provided with the flexible holding-brace $i$, whereby it can be folded down on the bottom of truck without unfastening or detaching either the board or brace, as described.

3. The hinged skids $l$, in combination with the truck-bottom A, substantially as and for the purposes set forth.

4. The combination, in a piano-truck, of the hinged skids $l$, the straps $o$, and the bottom A, substantially as and for the purposes set forth.

5. In piano-trucks, the springs $n$, in combination with the hinges $m$ and skids $l$, as and for the purposes set forth.

6. In piano-trucks, the combination of the truck-bottom A, side pieces, B, springs $f$, and legs C, substantially as shown and described.

LEWIS E. HURLBUT.

Witnesses:
JOHN WOLFINGER,
GEO. M. HALL.